United States Patent [19]

Spanke et al.

[11] 4,378,688
[45] Apr. 5, 1983

[54] APPARATUS FOR FEEDING AND ORIENTING WORKPIECES IN A PRESS

[75] Inventors: Edwin A. Spanke, Oak Forest; Melvin H. Francey, Palos Heights, both of Ill.

[73] Assignee: Gulf & Western Manufacturing Company, Southfield, Mich.

[21] Appl. No.: 243,247

[22] Filed: Mar. 12, 1981

[51] Int. Cl.³ .................. B21D 43/00; B21J 13/08
[52] U.S. Cl. .................. 72/420; 72/419; 83/445
[58] Field of Search .................. 72/419, 420, 422; 414/222, 749, 590, 750; 83/411 R, 412, 733, 445

[56] References Cited

U.S. PATENT DOCUMENTS

| | | | |
|---|---|---|---|
| 369,643 | 9/1887 | Kells | 72/420 |
| 1,129,663 | 2/1915 | Gier | 72/420 |
| 1,308,593 | 7/1919 | Kendall | 72/420 |
| 2,489,815 | 11/1949 | Rader | 72/311 |
| 2,676,640 | 4/1954 | Campbell et al. | 72/420 |
| 2,825,477 | 3/1958 | Ross | 414/590 |
| 3,126,770 | 3/1964 | Wuppermann et al. | 72/420 |
| 3,247,700 | 4/1966 | Gilbert | 72/420 |
| 3,698,273 | 10/1972 | Richard | 83/411 R |
| 3,818,745 | 6/1974 | Pollak et al. | 72/270 |
| 3,926,032 | 12/1975 | Brooks | 72/419 |
| 4,187,051 | 2/1980 | Kirsch et al. | 414/750 |

FOREIGN PATENT DOCUMENTS

| | | | |
|---|---|---|---|
| 2057515 | 6/1951 | Fed. Rep. of Germany | 72/422 |
| 909286 | 4/1954 | Fed. Rep. of Germany | 72/420 |

Primary Examiner—Lowell A. Larson
Attorney, Agent, or Firm—Body, Vickers & Daniels

[57] ABSTRACT

Apparatus is disclosed for shuttling a workpiece to a work station in a forging press and rotating the workpiece about a vertical axis to orient different portions thereof relative to the work station. The apparatus includes a workpiece support mounted on a horizontally reciprocable shuttle plate for displacement therewith toward and away from the press and for displacement relative thereto about and along a vertical axis. A workpiece to be forged is positioned on the workpiece support while the shuttle plate is displaced from the press, and displacement of the shuttle plate toward the press positions a portion of the workpiece at the press work station. A pair of leveling units are mounted on the shuttle plate adjacent the workpiece support and are operable to support portions of the workpiece outside the work station during a forging operation. During the forging operation, the workpiece support is lowered out of engagement with the workpiece and, following the forging operation, the workpiece support is raised to lift the workpiece from the leveling units and the press anvil at the work station. The workpiece support is then pivoted about the vertical axis to position another portion thereof at the work station, whereafter the workpiece support is lowered for the workpiece to be supported by the anvil and leveling units. When the entire forging operation has been completed, the workpiece is again elevated by the workpiece support and the shuttle plate is displaced outwardly from the press to facilitate removal of the finished workpiece.

30 Claims, 7 Drawing Figures

APPARATUS FOR FEEDING AND ORIENTING WORKPIECES IN A PRESS

BACKGROUND OF THE INVENTION

This invention relates to the art of presses and, more particularly, to apparatus for feeding workpieces to a press work station and orienting the workpiece at the station for work to be performed on different portions of the workpiece.

The present invention find particular utility in connection with forging operations performed on large annular metal workpieces and, accordingly, will be described in detail hereinafter in connection with such use. At the same time, however, it will be appreciated that the apparatus can be employed in connection with workpieces other than annular workpieces and in connection with the performing of work other than forging operations on the workpiece.

Heretofore, in connection with the forging of large, heavy metal workpieces in the form of plates, discs and/or rings, the workpiece has been positioned in the press die space through the use of a crane or roller table. When so positioned, a portion of the workpiece is supported within the die space by the anvil of the press and the remainder of the workpiece is supported externally of the press by appropriate workpiece leveling devices associated with the press and/or the shop floor adjacent the press. During the forging operation, the leveling devices operate to maintain the workpiece in a level orientation relative to the forge tooling. When it is desired to perform forging operations on different portions of the same workpiece, the workpiece must be elevated following one forging operation and then reoriented relative to the die space to bring an unworked portion of the workpiece thereinto. In connection with such a reorientation which requires rotation of the workpiece in a horizontal plane, such rotation has been achieved manually heretofore utilizing levers suspended on chains from overhead cranes, and this operation not only requires a large number of personnel but also is very demanding physically and requires considerable time. Accordingly, if several forging operations are required with respect to a given workpiece, the cost of production is undesirably high as a result of both the time and number of personnel required to achieve such production.

SUMMARY OF THE INVENTION

In accordance with the present invention, workpiece feeding and orienting apparatus is provided which is particularly suited for use with a forging press and which enables the reduction of both the time and number of personnel required to achieve initial loading of a workpiece in the die space area of the press, and to achieve the subsequent reorientation of the workpiece relative to the press tooling between successive working operations. More particularly in accordance with the present invention, a workpiece support is mounted on a horizontally reciprocable shuttle mechanism for displacement therewith toward and away from the press, and for both rotational and reciprocable displacement relative to the shuttle mechanism about and along a vertical axis. When the shuttle mechanism is in its outermost position relative to the press the workpiece support is adapted to receive a workpiece which is to be forged, and when the shuttle mechanism is in its innermost position relative to the press the workpiece support positions a portion of the workpiece at the work station of the press as defined by the anvil in the press die space and opposed tooling on the press slide. When the portion of the workpiece is so disposed at the work station, the workpiece support descends for the workpiece to be supported on the anvil. While the workpiece support can be designed to support and level the portion of the workpiece outside the press during the ensuing forging operation, the shuttle mechanism preferably is provided with leveling units adjacent the workpiece support to provide this support and leveling function, whereby the workpiece support is displaced downwardly out of contact with the workpiece during the forging operation. Following the latter, the workpiece support is elevated relative to the shuttle mechanism to lift the workpiece from the anvil and the leveling units, and the workpiece support is then pivoted about the vertical axis to position an unworked portion of the workpiece at the work station. The workpiece support is then lowered for the workpiece to engage the anvil and leveling units in preparation for the ensuing forging operation.

It will be appreciated from the foregoing description that loading of the workpiece in the press and reorientation of the workpiece relative to the press tooling at the work station thereof is achieved entirely by the shuttle mounted workpiece support without the use of overhead cranes, except for the initial loading of the workpiece on the workpiece support, and without the use of crane supported levers or the like and the labor of personnel to achieve manual reorienting of the workpiece. Following completion of the forging operations, the workpiece support is elevated to lift the workpiece from the anvil and leveling units, and the shuttle mechanism is displaced outwardly of the press to facilitate removal of the completed forging and the loading of another workpiece on the workpiece support. Accordingly, it will be appreciated that the structure and operation of the shuttle and workpiece support apparatus reduces the man hours heretofore required to achieve completion of a forging operation and the time and physical effort heretofore required to achieve reorientation of the workpiece, thus to substantially reduce production time and production costs.

It is accordingly an outstanding object of the present invention to provide apparatus for feeding large and heavy metal workpieces to a work station of a press and for reorienting the workpiece at the work station to facilitate the performance of work on different portions of the workpiece.

Another object is the provision of apparatus of the foregoing character which facilitates the support and displacement of a workpiece relative to tooling of a forging press and during the performance of a number of different forging operations on the workpiece so as to decrease the time required to complete a total forging operation.

Another object is the provision of apparatus of the foregoing character which enables a better utilization of the production capabilities of a forging press in connection with the performance of a number of forging operations on a given workpiece.

Still another object is the provision of apparatus of the foregoing character which minimizes time consuming manual operations heretofore required to position succeeding portions of a workpiece relative to a forging press work station by rotation of the workpiece.

A further object is the provision of apparatus of the foregoing character which includes a workpiece support elevatable and rotatable relative to a shuttle mechanism on which the workpiece support is mounted and by which a workpiece on the workpiece support is initially positioned relative to forging press tooling, and which workpiece support facilitates reorientation of the workpiece at the work station for a number of forging operations to be performed on different portions of the workpiece.

Still a further object is the provision of apparatus of the foregoing character which enables a substantial reduction in the time required to achieve several forging operations on a given workpiece, minimizes time and effort required to load, forge and unload the press, thereby achieving a substantial reduction in production time and costs.

BRIEF DESCRIPTION OF THE DRAWING

The foregoing objects, and others, will in part be obvious and in part pointed out more fully hereinafter in conjunction with the written description of a preferred embodiment illustrated in the accompanying drawings in which.

DETAILED DESCRIPTION OF THE DRAWINGS

Figure 1:
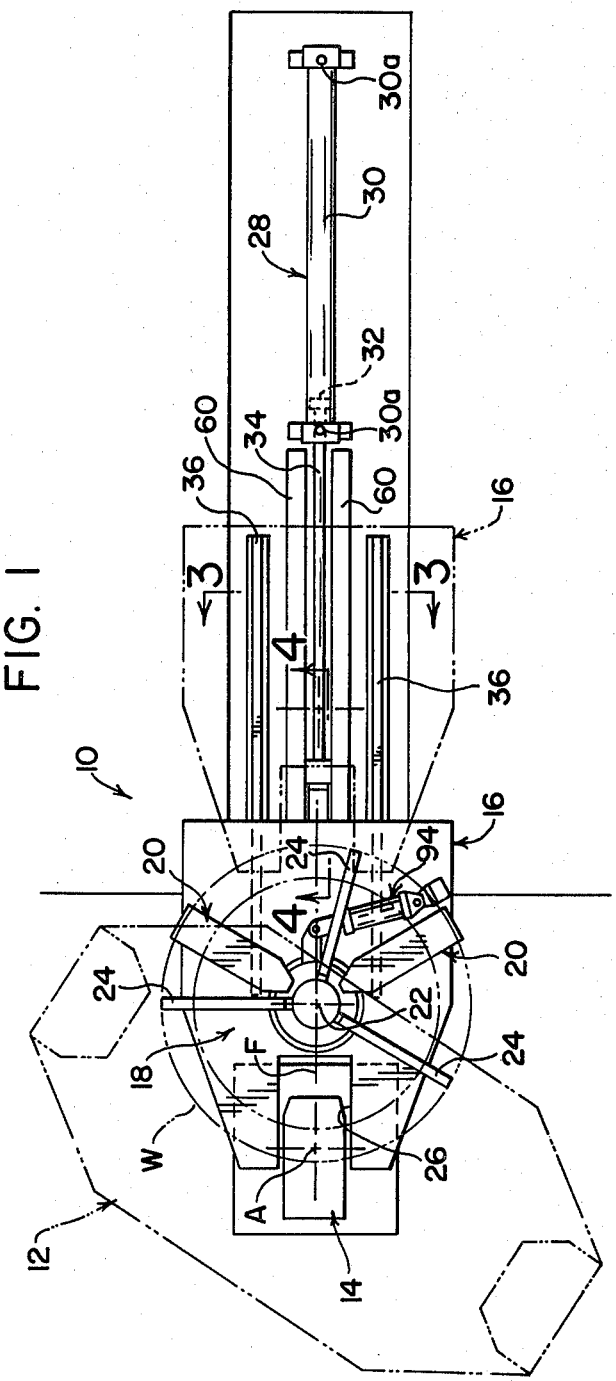
FIG. 1 is a plan view of workpiece feeding and orienting apparatus according to the present invention.
Figure 2:
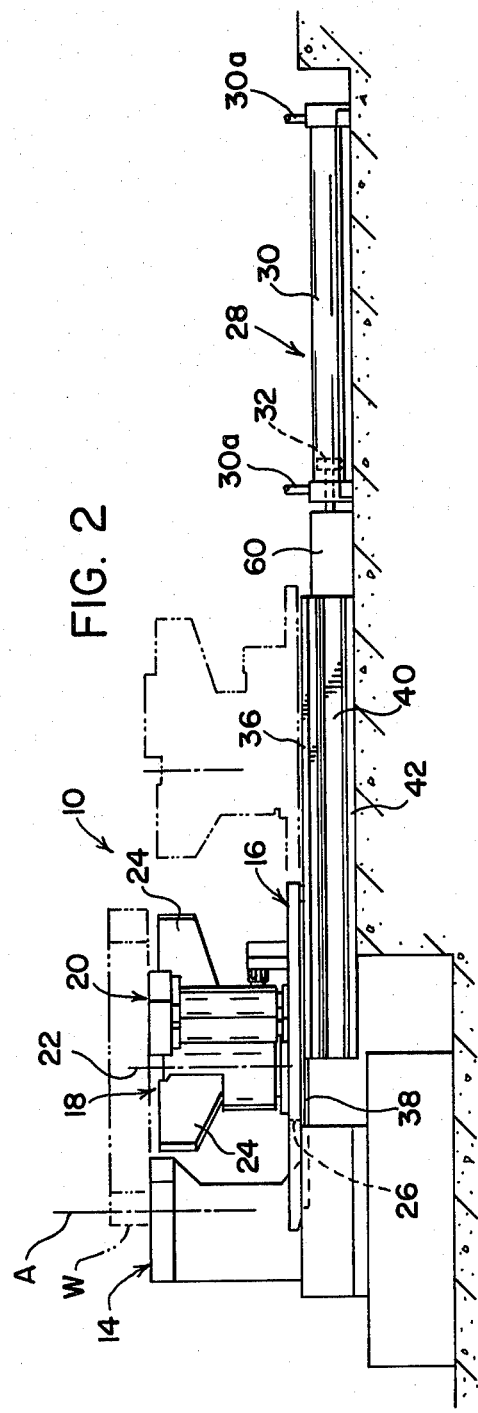
FIG. 2 is a side elevation view of the apparatus shown in FIG. 1.

With reference now in greater detail to the drawings wherein the showings are for the purpose of illustrating a preferred embodiment of the invention only and not for the purpose of limiting the invention, FIGS. 1 and 2 somewhat schematically illustrate workpiece feeding and orienting apparatus 10 in association with a forging press 12 and, more particularly, an anvil 14 in the die space area of the press. It will be appreciated, of course, that anvil 14 and cooperable tooling on the press slide, not illustrated, provide a work station in the press having a vertical axis A coinciding with the slide axis and that a workpiece to be forged within the press is positioned and supported on the anvil while the slide is in its uppermost position whereby the portion of the workpiece between the anvil and slide tooling is forged during a subsequent slide stroke.

With regard in general to workpiece feeding and orienting apparatus 10, the latter comprises a shuttle plate 16 carrying a workpiece support assembly 18 and a pair of workpiece leveling units 20, the structures and operations of which are described in detail hereinafter. Shuttle plate 16 is supported for horizontal reciprocation toward and away from press 12 along a feed path F intersecting press axis A and between the solid line and broken line positions of the shuttle plate illustrated in FIG. 1. In the broken line position, shuttle plate 16 and workpiece support assembly 18 are positioned for the workpiece support assembly to receive a workpiece W to be forged, and in the solid line position the workpiece support assembly positions a portion of the workpiece at the work station in appropriate relationship with respect to the press tooling by which the workpiece is to be forged. As will be described in greater detail hereinafter, workpiece support assembly 18 is mounted on shuttle plate 16 for pivotal and reciprocable displacement relative to a vertical mounting axis 22 and includes a plurality of workpiece support arms 24 extending radially of axis 22 and on which workpiece W rests during feeding and orienting movement of the workpiece relative to the press. The front end of shuttle plate 16 is provided with a recess 26 adapted to receive anvil 14 and enabling selective positioning of axis 22 relative to press axis A, whereby workpieces of different sizes can be supported on workpiece support assembly 18 and positioned in the press tooling area by appropriate location of shuttle plate 16 relative to press axis A. While workpiece W is shown as an annular ring, it will be appreciated that the workpiece can be solid and of disc, rectangular plate or other shape. The positioning capability between axis 22 and press axis A advantageously enables the forging of radially adjacent areas of a workpiece by advancement of shuttle plate 16 inwardly of the press between forging operations.

Figure 3:
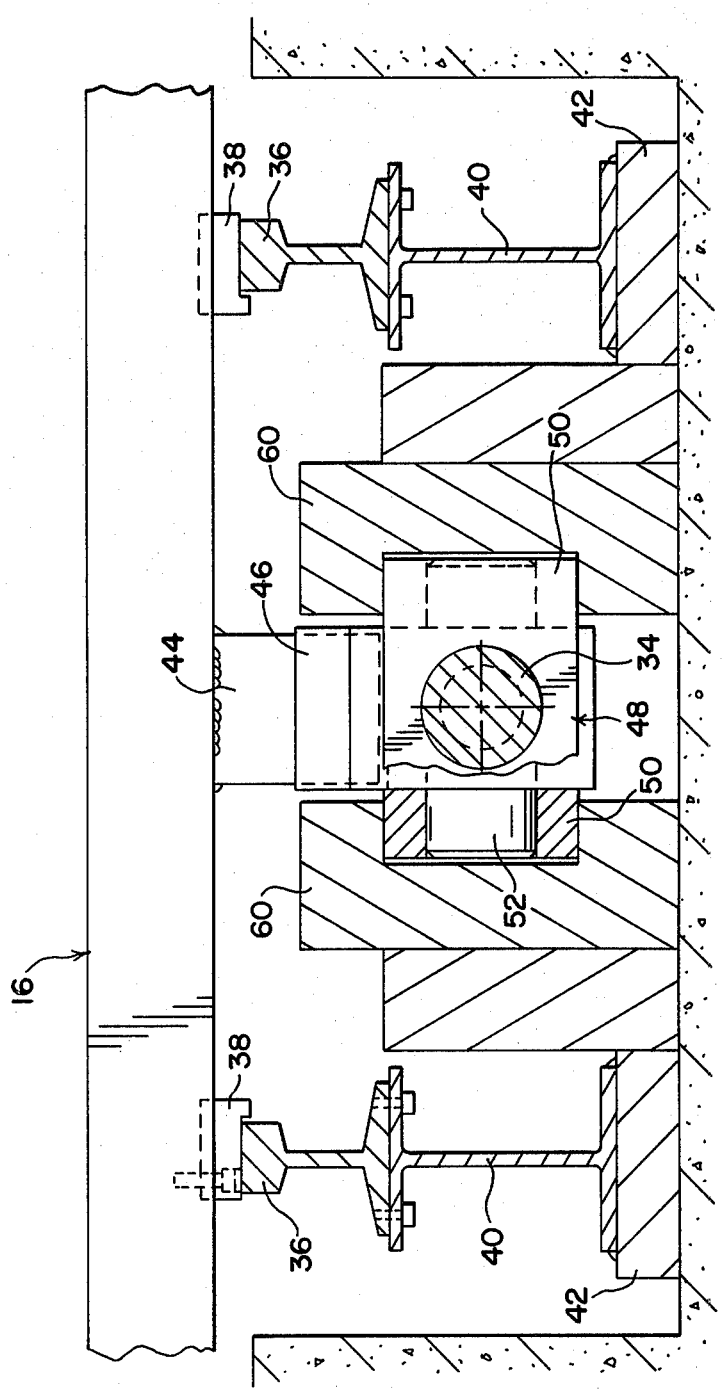
FIG. 3 is an enlarged cross-sectional elevation taken along line 3—3 in FIG. 1 and showing the guide and support arrangement for the shuttle plate component.
Figure 4:
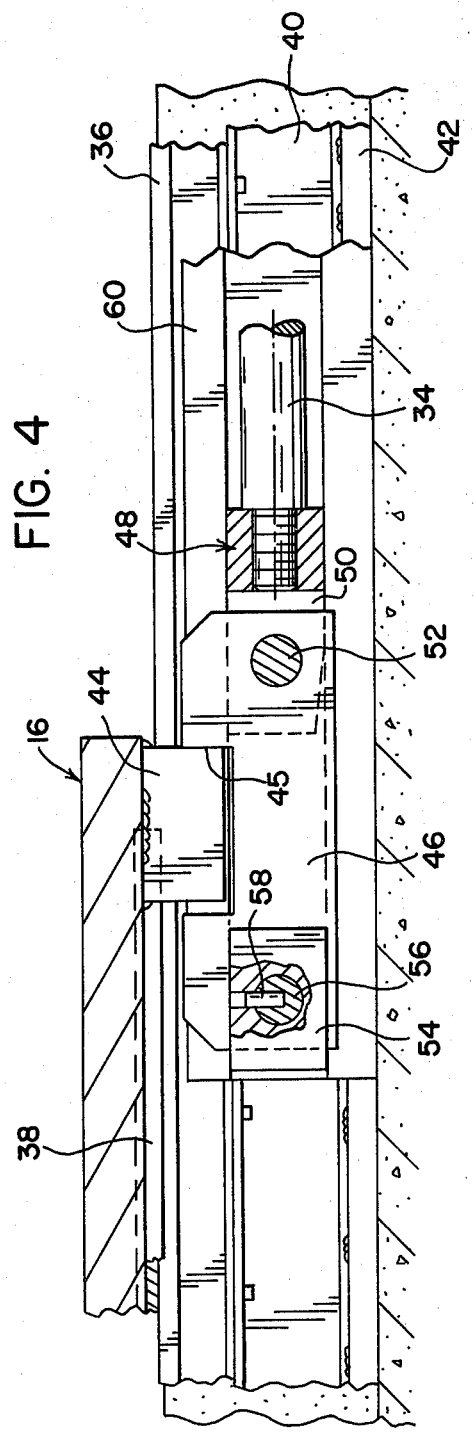
FIG. 4 is an enlarged sectional elevation view of a portion of the guide and support arrangement taken along line 4—4 in FIG. 1.

Horizontal reciprocation of shuttle plate 16 is achieved in the preferred embodiment by means of a hydraulic drive unit 28. Drive unit 28 includes a cylinder 30 fixed relative to the press and reciprocably supporting a piston 32 connected to a piston rod 34 having its outer end interconnected with shuttle plate 16 as described hereinafter for the latter to be reciprocated in response to reciprocation of piston 32 in cylinder 30. For the latter purpose, cylinder 30 has fluid ports 30a at the opposite ends thereof and connected to a suitable source of hydraulic fluid under pressure, not shown. It will be appreciated of course that fluid flow to and from the cylinder is adapted to be suitably controlled to achieve the desired displacement of shuttle plate 16. As will be best understood from FIGS. 1, 3 and 4 of the drawing, support and guidance for reciprocation of shuttle plate 16 is provided by a pair of parallel spaced apart guide tracks 36 on opposite sides of feed path F and underlying shuttle plate 16, and corresponding wear plates 38 mounted on the underside of shuttle plate 16. Guide rails 36 are suitably supported relative to ground such as by means of corresponding I-beams 40 and mounting pads 42.

The underside of shuttle plate 16 at the end thereof facing hydraulic drive unit 28 is provided with a centrally located depending drive block 44 which is welded or otherwise suitably secured to the shuttle plate. The lower end of block 44 is received in an upwardly open notch 45 provided in a coupling block 46. A U-shaped clevis block 48 has its outer end threadedly secured to the adjacent end of piston rod 34 and has a pair of legs 50 extending along opposite sides of coupling block 46 and interengaged therewith by means of a pin 52. It will be appreciated that these connections between drive block 44 and coupling block 46 and between the latter and piston rod 34 provide for shuttle plate 16 to reciprocate in response to reciprocation of the piston rod. In view of the size and weight of the component parts of the feeding and orienting apparatus and the long stroke of the piston rod in displacing shuttle plate 16 inwardly and outwardly of the press, it is preferred to provide support and guidance for coupling block 46 during reciprocation thereof. More particularly in this respect, the inner end of coupling block 46 is provided on each of its laterally opposite sides with a guide plate 54, only one of which is visible in FIG. 4. Guide plates 54 are supported on the coupling block by means of a common pin 56 extending laterally through block 46 and the guide plates and a corresponding keeper pin 58 extending downwardly through each guide block and into pin 56. Legs 50 of clevis block 48 provide guide plates at the corresponding end of coupling block 46, and guide plates 54 are of a width corresponding to that of legs 50. A pair of parallel opposed C-shaped guide components 60 are disposed on laterally opposite sides of feed path F and provide opposed inwardly facing horizontally extending guide recesses receiving and slidably supporting the corresponding ones of the clevis legs 50 and guide plates 54 on the coupling block 46. Accordingly, the coupling block is both laterally and vertically stabilized during reciprocation thereof and the resulting drive of shuttle plate 16. Preferably, as will be seen in FIG. 4, drive block 44 is slightly shorter axially than the length of notch 45 and is slightly spaced vertically above the bottom of the notch so as to avoid the imposition of any undesirable forces on coupling block 46 and its support components from shuttle plate 16 and which forces would increase the load on drive unit 28 beyond that which is normally required to achieve reciprocation of the shuttle plate.

As mentioned hereinabove, workpiece support assembly 18 is mounted on shuttle plate 16 for horizontal displacement therewith, and it will be appreciated from the foregoing description of the shuttle plate and the support arrangement therefor that reciprocation of piston rod 34 of drive unit 28 is adapted to be controlled so as to position axis 22 of the workpiece support assembly in a desired laterally spaced relationship with respect to press axis A. When the workpiece W has been positioned on support arms 24 of workpiece support assembly 18 and shuttle plate 16 has been displaced to the solid line position shown in FIG. 1 so as to appropriately position a portion of the workpiece relative to anvil 14 and press axis A, support arms 24 are adapted to be lowered for the workpiece to be supported by anvil 14 and leveling units 20 during a forging operation. Thereafter, support arms 24 are adapted to be elevated to lift the workpiece from the anvil and leveling units and then rotated about axis 22 to position an unworked portion of the workpiece at the work station. Thereafter, support arms 24 are again lowered for the workpiece to be supported by the anvil and leveling units 20 during the succeeding forging operation.

Figure 5:
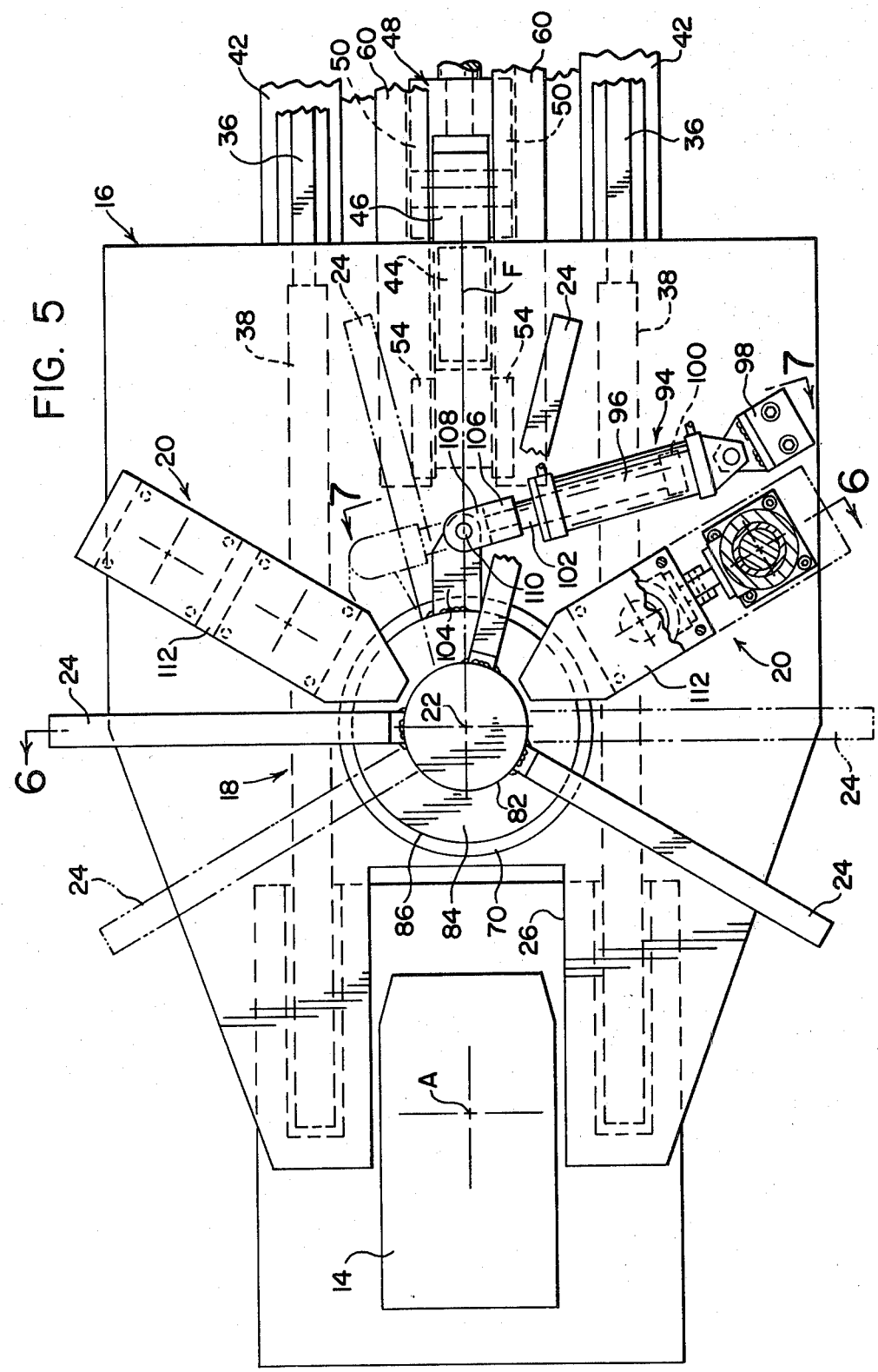
FIG. 5 is a plan view of the workpiece support and leveling units of the apparatus.
Figure 6:
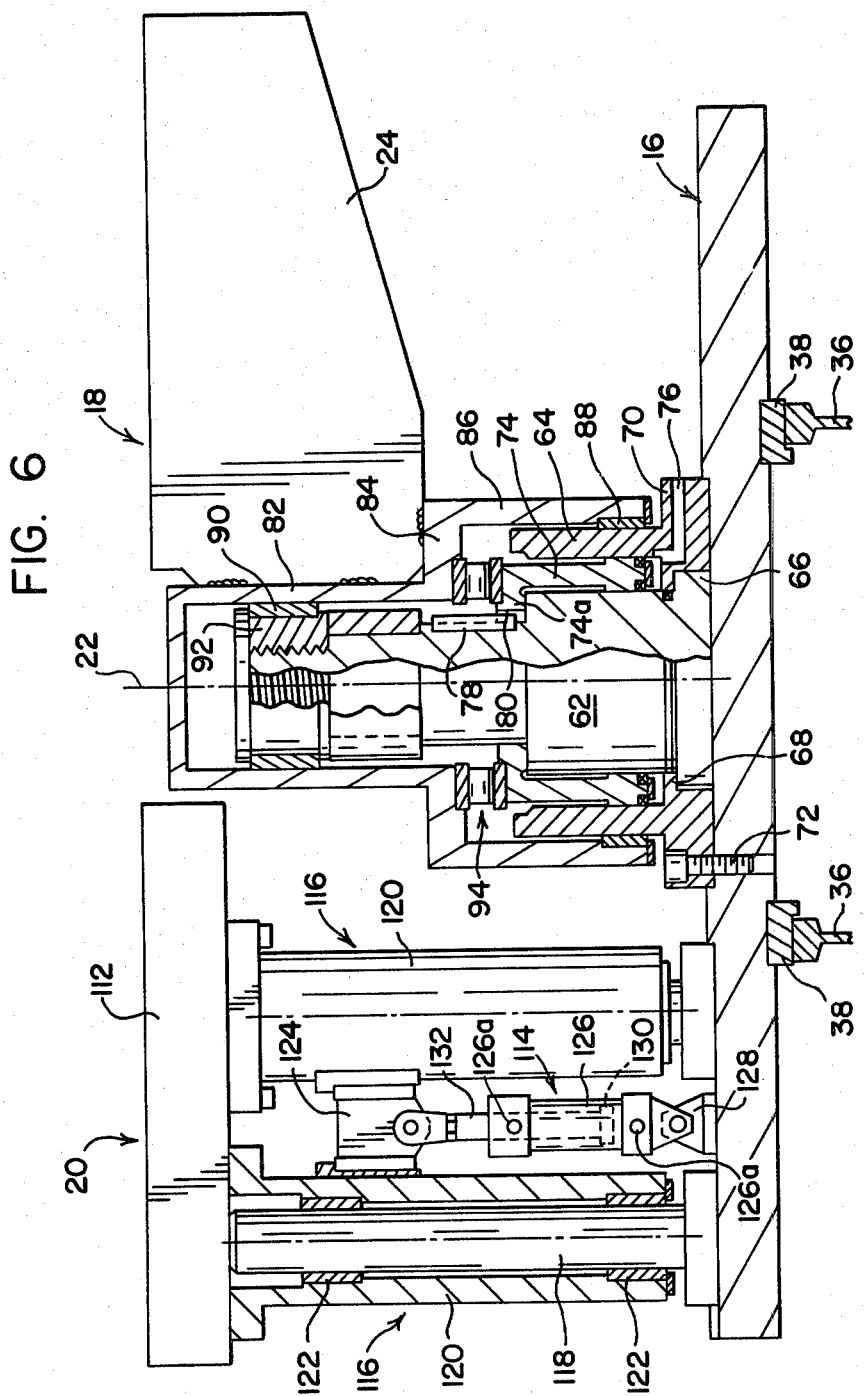
FIG. 6 is a sectional elevation view of the workpiece support and leveling units taken along line 6—6 in FIG. 5.
Figure 7:
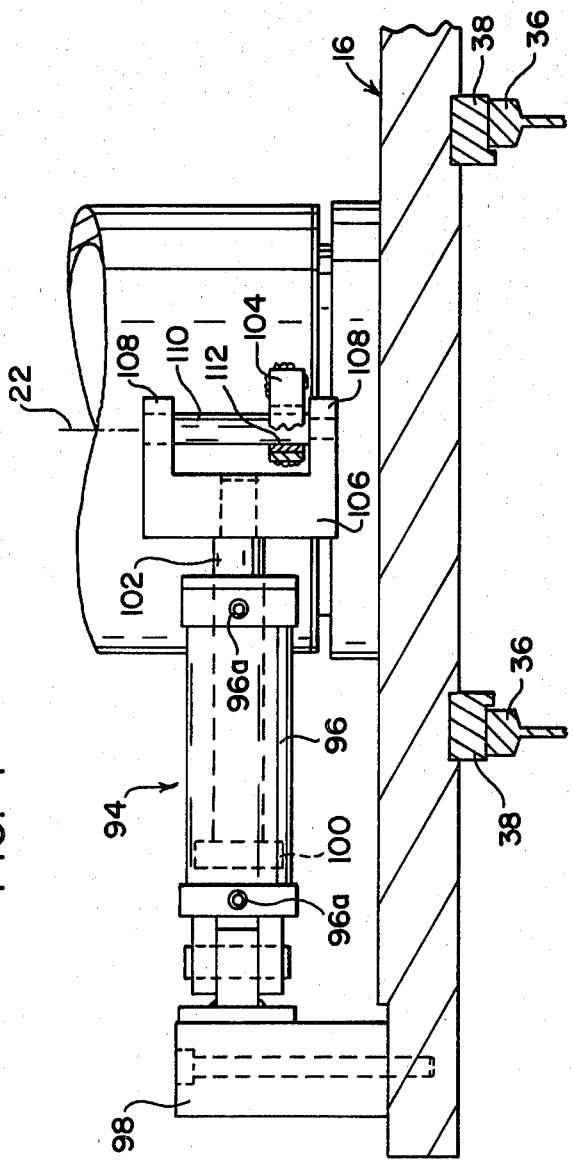
FIG. 7 is a sectional elevation view of the workpiece support indexing drive taken along line 7—7 in FIG. 5.

The structure and operation of workpiece assembly 18 and leveling units 20 by which the foregoing workpiece supporting and manipulating operations are achieved will be best understood from FIGS. 5-7 of the drawing. With reference to the latter Figures and with regard first to workpiece support assembly 18, the mounting arrangement by which support arms 24 are pivotal about and reciprocable along vertical axis 22 includes a vertically tiered mounting pin 62 coaxial with axis 22 and secured on the upper side of shuttle plate 16 by means of an annular cylinder member 64. More particularly, mounting pin 62 has a radially outwardly extending circumferential flange 66 at its lower end underlying a radially inwardly extending retaining flange 68 on cylinder member 64. Further, cylinder member 64 has a radially outwardly extending circumferential mounting flange 70 by which the cylinder is mounted on shuttle plate 16 by means of a plurality of bolts 72, thus for the cylinder member to clampingly engage mounting pin 62 against shuttle plate 16. The inner surface of cylinder member 64 and the outer surface of the corresponding axial portion of mounting pin 62 are radially spaced apart to provide an annular chamber therebetween reciprocably supporting an annular piston 74. Piston 74 is adapted to be displaced upwardly and downwardly in the chamber and, as will become apparent hereinafter, such displacement elevates and lowers support arm 24. Elevation of piston 74 is achieved by introducing hydraulic fluid under pressure into the lower end of the chamber through a passageway 76 in cylinder flange 70. It will be appreciated of course that the latter passageway is adapted to be connected to a suitable source of hydraulic fluid under pressure, not shown, and through suitable controls to achieve such elevating of piston 74 and to achieve lowering thereof by exhausting hydraulic fluid under pressure from the chamber. Preferably, piston 74 is prevented from rotating relative to mounting pin 62 during reciprocation of the piston by means of a key 78 on the pin and a key engaging guideway 80 on the inner surface of radially inwardly extending flange portion 74a of piston 74.

Workpiece support arms 24 are supported on mounting pin 62 for rotation relative thereto and for reciprocation axially thereof by means of a mounting sleeve assembly including an upper sleeve portion 82 surrounding the upper portion of pin 62, an annular bearing plate portion 84 at the lower end of sleeve 82 and extending radially outwardly therefrom, and a lower sleeve portion 86 extending downwardly from bearing plate portion 84 along the outer side of cylinder member 64. Workpiece support arms 24 are mounted on upper sleeve portion 82 such as by welding and extend radially outwardly therefrom in circumferentially spaced apart relationship with respect to axis 22. A sleeve bushing 88 is interposed between lower sleeve portion 86 and cylinder member 64 to rotatably and reciprocably support the lower end of the mounting sleeve assembly, and a sleeve bushing 90 is provided at the upper end of mounting pin 62 for the same purpose and is interposed between upper sleeve portion 82 and a cap nut 92 threadedly interengaged with the upper end of pin 62. The mounting sleeve assembly and thus support arms 24 are supported for rotation about axis 22 by means of a thrust bearing assembly 94 interposed between piston flange 74a and bearing plate portion 84 of the mounting sleeve assembly. It will be appreciated from the latter relationship that the sleeve assembly is vertically coupled with piston 74 through the thrust bearing assembly, whereby elevating and lowering of piston 74 results in elevating and lowering the sleeve assembly and thus arms 24.

As best seen in FIGS. 5 and 7 of the drawing, rotation of the mounting sleeve assembly and thus workpiece support arms 24 about axis 22 is achieved by means of a hydraulic drive unit 94. In the preferred embodiment, drive unit 94 includes a cylinder 96 having its outer end pivotally interconnected with a mounting block 98 bolted or otherwise secured to shuttle plate 16, and a piston 100 reciprocably received within cylinder 96 and attached to a piston rod 102 having its outer end pivotally interconnected with an operating arm 104 welded to and extending radially outwardly from lower sleeve portion 86 of the mounting sleeve assembly. More particularly in this respect, the outer end of piston rod 102 is threadedly interengaged with a C-shaped clevis member 106 having legs 108 vertically spaced apart a distance greater than the vertical thickness of arm 104, and arm 104 is disposed between legs 108 and is pivotally and reciprocably interengaged with clevis 106 by means of a pin 110 extending between legs 108 and through a bushed opening 112 in arm 104. It will be appreciated that the latter pivotal and reciprocable interengaging relationship facilitates vertical displacement of the mounting sleeve assembly relative to drive unit 94. Cylinder 96 has fluid ports 96a at its opposite ends, whereby piston 100 and thus piston rod 102 are adapted to be reciprocated relative to cylinder 96 by introducing hydraulic fluid under pressure from a suitable source into the cylinder alternately on opposite sides of the piston. Such reciprocation of the piston rod of course oscillates the mounting sleeve assembly and thus workpiece support arms 24 in opposite directions about axis 22. More particularly in this respect, with reference to FIG. 5 of the drawing, the solid line positions of workpiece support arms 24 are the positions thereof for supporting and feeding a workpiece into the press die space by movement of shuttle plate 16 toward the press. Following a forging operation, arms 24 are elevated and displaced counterclockwise to the broken line positions shown to rotate the workpiece relative to the press work station, whereafter the support arms are lowered as described hereinabove. When so lowered, drive unit 94 is operated to pivot arms 24 clockwise back to the solid line positions shown in FIG. 5 in readiness for the next workpiece orienting operation thereof.

As mentioned hereinabove, the workpiece to be forged is supported on the press anvil and by leveling units 20 during the forging operation. Accordingly, it will be appreciated that the upper sides of leveling units 20 are spaced slightly above the plane of support arms 24 when the latter are in their lowermost positions as determined by engagement of piston flange 74a with the underlying shoulder of the lower portion of mounting pin 62. During the forging operation, leveling units 20 are adapted to move downwardly in coordination with the movement of the workpiece relative to the press to maintain the workpiece level during the forging operation. The structure of leveling units 20 by which this function is achieved will be best understood from FIGS. 5 and 6 of the drawing. In this respect, two leveling units are provided on shuttle plate 16 for displacement therewith and reciprocation vertically relative thereto, and each of the units is disposed between an adjacent pair of the workpiece support arms 24 in a radial disposition relative to axis 22.

Leveling units 20 are identical in structure and operation, whereby it will be appreciated that the following description of the unit shown in detail in FIG. 6 is applicable to both units. Each of the leveling units 20 includes a top plate member 112 having a radial extent enabling the support of the different size workpieces which can be supported by arms 24. Top plate member 112 is adapted to be vertically reciprocated relative to shuttle plate 16 and workpiece support assembly 18 by means of a corresponding hydraulic drive unit 114, and support and guidance for reciprocation of each of the top plates is provided by a corresponding pair of pin and sleeve assemblies 116 on radially opposite sides of drive unit 114. Each of the pin and sleeve assemblies includes a vertical guide pin 118 suitably attached at its lower end to shuttle plate 16 and a guide sleeve 120 surrounding the pin and suitably attached at its upper end to top plate member 112. A pair of axially spaced apart guide bushings 122 are interposed between each pin 118 and the corresponding sleeve 120. Reciprocation of top plate 112 is achieved by displacing sleeves 120 vertically relative to pins 118 by means of the drive unit 114. For this purpose, sleeves 120 are rigidly interconnected by a tie plate 124 extending therebetween and suitably fastened thereto, and drive unit 114 is interconnected with the tie plate 124 and shuttle plate 16. More particularly in this respect, in the embodiment illustrated drive unit 114 includes a cylinder 126 having its lower end pivotally interconnected with a mounting plate 128 on shuttle plate 16, and a piston 130 reciprocably received in cylinder 126 and attached to a piston rod 132 which has its outer end pivotally fastened to tie plate 124. The opposite ends of cylinder 126 are provided with fluid ports 126a, and it will be appreciated that vertical reciprocation of top plate member 112 is achieved by alternately introducing hydraulic fluid under pressure into cylinder 126 on opposite sides of piston 130. It will be further appreciated that fluid ports 126a are connected to a suitable source of hydraulic fluid under pressure and through appropriate controls to achieve the desired elevating and lowering of top plate member 112 to maintain a workpiece level during a forging operation.

With regard to the operation of the workpiece feeding and orienting apparatus, shuttle plate 16 and thus workpiece support assembly 18 and leveling units 20 are initially in the broken line positions shown in FIGS. 1 and 2 and are so positioned by appropriate operation of drive unit 28. In such position, workpiece support assembly 18 is outside the press die space area and is positioned relative to shuttle plate 16 to receive a workpiece W to be forged. In this respect, with reference to FIGS. 5 and 6 of the drawing, workpiece support arms 24 are in the solid line positions thereof shown with respect to axis 22, and hydraulic fluid under pressure is introduced through passageway 76 to elevate piston 74 and thus workpiece support arms 24 for the upper ends of the arms to be above the plane of the top surfaces of top plate members 112 of leveling units 20. Workpiece W is then loaded onto support arms 24 through the use of a crane or the like and, assuming the workpiece to be an annular ring as described in connection with the preferred embodiment, the workpiece is centered with respect to axis 22. When the workpiece is so loaded on support arms 24, drive unit 28 is actuated to displace shuttle plate 16 and thus workpiece support assembly 18 and leveling units 20 to the solid positions thereof shown in FIG. 1, whereby a portion of workpiece W is appropriately positioned relative to press axis A and in overlying relationship with anvil 14. Hydraulic fluid under pressure is then introduced into cylinders 126 of leveling units 20 to elevate top plates 112 thereof to the plane of anvil 14, and the hydraulic fluid behind piston 74 of workpiece support assembly 18 is exhausted to lower support arms 24 out of engagement with the workpiece, whereby the latter is supported by anvil 14 and top plates 112 of leveling units 20. The press is then actuated to achieve a forging operation on the portion of workpiece W at the press work station and, during the forging operation, hydraulic fluid flow is controlled with respect to cylinders 126 of leveling units 20 as is necessary to maintain workpiece W level. Following the forging operation, hydraulic fluid under pressure is again introduced through passageway 76 to elevate piston 74 and thus workpiece support arms 24 for the latter to engage and elevate workpiece W upwardly out of engagement with anvil 14 and top plates 112 of leveling units 20. While the support arms are so elevated, hydraulic fluid under pressure is introduced into cylinder 96 of drive unit 94 to achieve rotation of the support arms counterclockwise about axis 22 from the solid to the broken line positions of the arms shown in FIG. 5, whereby an unworked portion of workpiece W is displaced into position with respect to anvil 14 and axis A. While support arms 24 are in the latter positions, hydraulic fluid is exhausted from beneath piston 74 to lower arms 24 out of engagement with the workpiece, whereby the workpiece becomes supported once again by anvil 14 and top plates 112 of leveling units 20. Hydraulic fluid under pressure is then introduced into cylinder 96 of drive unit 94 to displace arms 24 clockwise about axis 22 and back to the solid line positions thereof shown in FIG. 5. The press is then operated to achieve another forging operation with respect to the workpiece. When forging of the workpiece is completed, support arms 24 are elevated in the foregoing manner to lift the workpiece from anvil 14 and leveling units 20, drive unit 28 is actuated to displace shuttle plate 16 and thus workpiece support assembly 18 and leveling units 20 back to the broken line positions thereof shown in FIG. 1, and the forged workpiece is removed from the apparatus.

In the preferred embodiment, each leveling unit extends at an angle of about 120° with respect to anvil 14. This provides for optimizing support of the workpiece during a forging operation. In connection with such positioning, arms 24 are positioned relative to the leveling units and to one another to provide adequate support of a workpiece during feeding and orienting thereof, and to enable rotation of the arms up to about 30° relative to axis 22 without interferring engagement with the leveling units or anvil 14.

While particular emphasis has been placed on the structure and operation of certain of the component parts of the preferred embodiment of apparatus herein illustrated and described, it will be appreciated that many embodiments of the invention can be made and that many changes can be made in the preferred embodiment without departing from the principles of the present invention. In this respect, for example, while optimum three point support for a workpiece during forging is achieved by separate leveling units positioned as described herein, it will be appreciated that the workpiece support assembly could function in place thereof to provide workpiece leveling. Likewise, suitable drive arrangements other than piston and cylinder units can be employed to achieve the various displacements of the component parts of the apparatus. These and other changes in the preferred embodiment will be suggested and obvious from the foregoing description, as will be other embodiments of the invention. Accordingly, it is to be distinctly understood that the foregoing descriptive matter is to be interpreted merely as illustrative of the present invention and not as a limitation.

Having thus described the invention, it is claimed:

1. Apparatus for feeding and orienting a workpiece relative to a work station in a press comprising, shuttle means, means supporting said shuttle means for reciprocation relative to said press between workpiece receiving and press loading positions, means including workpiece support means on said shuttle means underlying and supporting a workpiece in a working position at said work station and in a feeding position spaced above said working position, mounting means supporting said workpiece support means on said shuttle means for displacement relative thereto along a vertical axis for said workpiece support means to engage under and displace a workpiece between said feeding and working positions, said mounting means further supporting said workpiece support means for displacement about said vertical axis to rotate a workpiece supported at said work station in said feeding position, and means for displacing said workpiece support means along and about said axis.

2. Apparatus according to claim 1, wherein said means for displacing said workpiece support means includes first means to pivot said workpiece support means in opposite directions about said axis, and second means to reciprocate said workpiece support means in opposite directions along said axis.

3. Apparatus according to claim 2, and means to reciprocate said shuttle means between said workpiece receiving and press loading positions.

4. Apparatus for feeding and orienting a workpiece relative to a work station in a press comprising, shuttle means, means supporting said shuttle means for reciprocation relative to said press between workpiece receiving and press loading positions, means including workpiece support means on said shuttle means for supporting a workpiece in a working position at said work station and in a feeding position spaced above said working position, mounting means supporting said workpiece support means on said shuttle means for displacement relative thereto along a vertical axis for said workpiece support means to displace a workpiece between said feeding and working positions, said mounting means further supporting said workpiece support means for displacement about said axis, and means for displacing said workpiece support means along and about said axis, said means including workpiece support means further including vertically displaceable workpiece leveling means for supporting said workpiece in said working position, and means for displacing said leveling means vertically relative to said shuttle means and said workpiece support means.

5. Apparatus according to claim 4, wherein said workpiece support means includes at least three workpiece support arms extending radially of said axis in circumferentially spaced apart relationship with respect thereto, and said leveling means includes a pair of workpiece support members each extending radially of said axis between a different two of said arms.

6. Apparatus according to claim 5, wherein said means to displace said workpiece support means includes first and second piston and cylinder means between said shuttle means and workpiece support means to respectively reciprocate said support arms vertically and oscillate said support arms relative to said axis, and said means to displace said leveling means includes third piston and cylinder means between said shuttle means and each said workpiece support members.

7. Apparatus according to claim 6, and fourth piston and cylinder means for reciprocating said shuttle means between said workpiece receiving and press loading positions.

8. Apparatus for feeding and orienting a workpiece relative to a work station in a press comprising, shuttle means, means supporting said shuttle means for reciprocation between first and second positions relative to said press, workpiece support means, means mounting said workpiece support means on said shuttle means for reciprocation therewith and for displacement relative thereto about and along a vertical axis, said workpiece support means positioning a workpiece thereon at said work station when said shuttle means is in one of said positions and being laterally spaced from said work station when said shuttle means is in the other of said positions, workpiece leveling means mounted on said shuttle means for displacement therewith and for vertical reciprocation relative thereto and to said workpiece support means, and means for displacing said workpiece support means relative to said shuttle means.

9. Apparatus according to claim 8, wherein said means for displacing said workpiece support means includes means to pivot said workpiece means in opposite directions about said axis.

10. Apparatus according to claim 9, wherein said means to pivot said workpiece support means includes first piston and cylinder means between said shuttle means and workpiece support means.

11. Apparatus according to claim 8, wherein said means for displacing said workpiece support means includes means to reciprocate said workpiece support means in opposite directions along said axis.

12. Apparatus according to claim 11, wherein said means to reciprocate said workpiece support means includes second piston and cylinder means between said shuttle means and workpiece support means.

13. Apparatus according to claim 8, and means to reciprocate said shuttle means between said first and second positions thereof.

14. Apparatus according to claim 13, wherein said means to reciprocate said shuttle means includes third piston and cylinder means comprising a cylinder fixed relative to said press and a piston rod reciprocable relative to said cylinder and connected to said shuttle means.

15. Apparatus according to claim 8, wherein said leveling means includes a pair of leveling units each having a workpiece engaging member and vertically extendable and retractable piston and cylinder means between said member and said shuttle means.

16. Apparatus according to claim 8, wherein said means for displacing said workpiece support means includes first means to pivot said workpiece support means in opposite directions about said axis and second means to reciprocate said workpiece support means in opposite directions along said axis.

17. Apparatus according to claim 16, wherein said first and second means respectively includes first and second extendable and retractable piston and cylinder means between said shuttle means and said workpiece support means, said leveling means including workpiece engaging member means and third extendable and retractable piston and cylinder means between said member means and shuttle means.

18. Apparatus according to claim 17, and drive means to reciprocate said shuttle means between said first and second positions thereof.

19. Apparatus for feeding and orienting a workpiece relative to a work station in a press comprising, shuttle plate means, means supporting and guiding said shuttle plate means for reciprocation between first and second positions relative to said press, means for reciprocating said shuttle plate means between said positions, workpiece supporting member means, mounting means supporting said member means on said shuttle plate means for displacement therewith, said member means positioning a workpiece thereon at said work station when said shuttle plate means is in one of said positions and being laterally spaced from said work station when said shuttle plate means is in the other of said positions, said mounting means including means supporting said member means for pivotal movement relative to said shuttle plate means about a vertical axis and for reciprocation relative to said shuttle plate means along said axis, first means to pivot said member means about said axis, second means to reciprocate said member means along said axis, and workpiece leveling means on said shuttle plate means adjacent said member means and including workpiece engaging upper end means and means to elevate and lower said upper end means relative to said shuttle plate means.

20. Apparatus according to claim 19, wherein said member means includes a plurality of radially extending workpiece support arms spaced apart about said axis, said first means to pivot said member means including means to pivot said arms in opposite directions about said axis between first and second arm positions.

21. Apparatus according to claim 20, wherein said leveling means includes a pair of leveling units on said shuttle plate means, said upper end means of each unit being circumferentially positioned between a different adjacent pair of said support arms.

22. Apparatus according to claim 21, wherein said upper end means of each leveling unit includes a plate member extending radially of said axis and having radially inner and outer ends, said means to elevate and lower said upper end means including piston and cylinder means between said radially inner and outer ends of said plate member, and interengaging guide pin and guide sleeve means between said plate member and said shuttle plate means on radially opposite sides of said piston and cylinder means.

23. Apparatus according to claim 20, wherein said mounting means includes vertical pin means on said shuttle plate means and providing said axis, and sleeve means received and supported on said pin means for pivotal and reciprocable displacement relative thereto, said support arms being mounted on said sleeve means.

24. Apparatus according to claim 23, wherein said means to pivot said arms includes extendable and retractable piston and cylinder means between said sleeve means and said shuttle plate means.

25. Apparatus according to claim 24, wherein said leveling means includes a pair of leveling units on said shuttle plate means, said upper end means of each unit being circumferentially positioned between a different adjacent pair of said support arms.

26. Apparatus according to claim 23, wherein said second means to reciprocate said member means includes means cooperable with said pin means to provide piston chamber means, piston means vertically reciprocable in said chamber means and interengaging with said sleeve means for said sleeve means to reciprocate vertically in response to reciprocation of said piston means.

27. Apparatus according to claim 26, wherein said leveling means includes a pair of leveling units on said shuttle plate means, said upper end means of each unit being circumferentially positioned between a different ajdacent pair of said support arms.

28. Apparatus according to claim 23, wherein said means to pivot said arms includes extendable and retractable piston and cylinder means between said sleeve means and said shuttle plate means, and wherein said second means to reciprocate said member means includes means cooperable with said pin means to provide piston chamber means, and piston means vertically reciprocable in said chamber means and interengaging with said sleeve means for said sleeve means to reciprocate vertically in response to reciprocation of said piston means.

29. Apparatus according to claim 28, wherein said leveling means includes a pair of leveling units on said shuttle plate means, said upper end means of each unit being circumferentially positioned between a different adjacent pair of said support arms.

30. Apparatus according to claim 29, wherein said upper end means of each leveling unit includes a plate member extending radially of said axis and having radially inner and outer ends, said means to elevate and lower said upper end means including piston and cylinder means between said radially inner and outer ends of said plate member, and interengaging guide pin and guide sleeve means between said plate member and shuttle plate means on radially opposite sides of said piston and cylinder means.

* * * * *